United States Patent [19]
Watson

[11] Patent Number: 5,771,931
[45] Date of Patent: Jun. 30, 1998

[54] HIGH PRESSURE WEAR RESISTANT PILOT VALVE

[75] Inventor: Richard R. Watson, Missouri City, Tex.

[73] Assignee: Gilmore Valve Company, Houston, Tex.

[21] Appl. No.: 739,887

[22] Filed: Oct. 31, 1996

[51] Int. Cl.[6] .................................................. F15B 13/042
[52] U.S. Cl. .................................. 137/625.66; 137/236.1; 137/625.27; 251/368; 251/900
[58] Field of Search ........................... 137/236.1, 625.27, 137/625.66; 251/368, 900

[56] References Cited

U.S. PATENT DOCUMENTS

| | | |
|---|---|---|
| 3,235,224 | 2/1966 | Grove . |
| 3,921,660 | 11/1975 | Kowalski ........................ 137/625.66 X |
| 4,011,892 | 3/1977 | Kowalski . |
| 4,089,534 | 5/1978 | Litherland . |
| 4,404,989 | 9/1983 | LeMoine ........................ 137/236.1 X |
| 4,457,489 | 7/1984 | Gilmore .......................... 137/625.66 X |
| 4,887,643 | 12/1989 | Tomlin et al. ..................... 137/625.66 |
| 5,409,040 | 4/1995 | Tomlin ............................. 137/625.66 |

*Primary Examiner*—Gerald A. Michalsky
*Attorney, Agent, or Firm*—Bush, Riddle and Jackson

[57] ABSTRACT

A reciprocating sleeve type valve mechanism having a valve housing within which is located a cage element. A piston, movably positioned within the valve housing, accomplishes linear opening movement of a cylindrical seal sleeve with respect to spaced polymer seals within the housing. Closing movement of the seal sleeve is accomplished by a return spring. Sealing between the cage element and a wear resistant external ceramic liner of the seal sleeve is accomplished by a seal assembly having a centrally located elastomer seal ring with polymer backup wiper rings positioned on opposite sides thereof. The seal assembly provides a bearing and guiding function to stabilize the seal sleeve during its opening and closing movement and to wipe particulate from the sealing surface of the seal sleeve as well as to maintain efficient sealing with the seal sleeve as the valve is opened and closed.

18 Claims, 2 Drawing Sheets

HIGH PRESSURE WEAR RESISTANT PILOT VALVE

BACKGROUND OF THE INVENTION

1. Field of the Invention

This invention relates generally to pilot valves which are responsive to pilot pressure for shifting an internal mechanism from a first position, typically the closed position, where pressurized fluid from a supply to a function is blocked, to a second position, typically the open position where pressurized fluid supply is conducted through the valve mechanism to a function port for accomplishing work. Typically in two position, three-way pilot valves, in the closed position of the valve, the function port is in communication with a vent port to thus permit venting of pressurized fluid from the function circuit, so that the function circuit can return to its non-pressurized condition. Further, the present invention concerns the provision of wear resistance features in high pressure pilot valves to thereby ensure extended service life thereof.

2. Description of the Prior Art

Two position three-way pilot valves are well known in the art as indicated by U.S. Pat. No. 4,011,892 of Kowalski which has a piston member 72 being movable responsive to pilot pressure via supply line 100 and pressure chamber 70 to displace sea water from a chamber 62 via passages 64 and 68 and to cause opening of a sleeve valve member. The piston incorporates a piston stem having a sleeve valve 30 fixed thereto and moveable to positions having sealing contact with upper and lower polymer seals 32 and 22 respectively. The sleeve valve defines an external cylindrical sealing surface having sealing engagement with an internal O-ring seal that is supported by an intermediate partition 26 of a cage member that is sealed to the valve body.

One of the problems that are inherent with sleeve valves of the nature of the '892 patent is the wear or erosion of the sealing surface of the seal sleeve that can occur as the valve sleeve is reciprocated between its open and closed positions. Often the fluid interchange between the function and vent ports will contain a quantity of abrasive particulate. This particulate, especially when O-rings are employed as seals, can foul the sealing interface, thus causing abrasive wear of the external sealing surface of the seal sleeve during its movement between its open and closed positions. It is desirable to provide a pilot valve mechanism having an axially moveable seal sleeve and yet ensuring that minimal wear of the external cylindrical sealing surface of the seal sleeve can occur even in the presence of an abrasive particulate within the valve chamber. If particulate is present within the function/vent fluid interchange, it is desirable to provide a wiping function at the sealing interface of the seal sleeve so that any particular that may be present on the cylindrical sealing surface of the seal sleeve will be wiped away during opening and closing movement of the seal sleeve, thus minimizing the potential for its presence within the sealing interface. Further, in the event some particulate should enter the sealing interface, it is desirable to minimize the potential for the particulate to cause scratching or abrasion of the cylindrical sealing surface of the seal sleeve member. It is also desirable to provide a sleeve valve mechanism having extended service life by providing the seal sleeve thereof with a wear resistant cylindrical sealing surface that resists scratching and abrasion even when a abrasive particulate is present within the sealing interface.

SUMMARY OF THE INVENTION

It is a principal feature of the present invention to provide a novel pilot valve mechanism having an axially moveable seal sleeve and incorporating a sealing system that substantially excludes liquid entrained particulate from the seal interface between the axially moveable valve sleeve and the cage member.

It is also a feature of the present invention to provide a novel pilot valve mechanism having an axially moveable valve sleeve that is sealed with respect to an internal cage of the pilot valve and wherein the valve sleeve is provided with an external cylindrical layer of wear resistant material which minimizes the potential for valve sleeve wear during opening and closing movement thereof, even when particulate is present in the fluid being handled.

It is an even further feature of the present invention to provide a novel pilot valve mechanism having a seal sleeve that is axially moveable within an internal cage of the valve mechanism and wherein sealing between the seal sleeve and cage is accomplished by a seal assembly having an intermediate circular elastomeric sealing element with wiper type backup seal rings located on either side thereof to exclude contaminants such as particulate from the seal interface between the valve sleeve and cage.

It is further feature of this invention to provide a novel sleeve valve mechanism having a linearly movable seal sleeve defining an external cylindrical sealing surface and being engaged by a seal assembly of substantial axial width, which provides a bearing function as well as a sealing function to stabilize and guide the seal sleeve during its opening and closing movement.

Briefly, the various objects and features of the present invention are realized through the provision of a moveable sleeve type pilot valve mechanism having a valve housing within which upper and lower seal elements are maintained in spaced relation by a perforate cage member having an intermediate portion thereof maintained in sealed relation with the valve body. The spaced seal members are composed of a substantially rigid sealing material such as Delrin® or any of a number of other suitable polymer materials and are each sealed externally thereof with the valve housing. The spaced seal members are maintained in fixed relation with the valve housing by means of a spacer element which is forced against the upper seal member by an inner or upper housing member that is secured by threaded connection within an outer or lower housing member as shown in the appended drawings. The inner housing member defines a piston chamber within which is located a piston member having an elongate piston stem to which is fixed a valve sleeve so that axial movement of the piston member responsive to pilot pressure, will cause corresponding axial movement of the seal sleeve between the open and closed positions thereof within the valve chamber. A compression spring is located within the piston chamber and functions to return the piston and piston stem to a position closing the valve. The inner housing also defines a pilot pressure circuit which communicates pilot pressure to the piston chamber at one end of the piston member responsive to controlled positioning of a solenoid operated pilot control valve.

The lower or inner valve housing defines a supply inlet port which supplies pressurized fluid to an internal valve chamber located on one side of the intermediate cage portion, a function port which is in communication with a function/vent chamber of opposite side of the intermediate cage portion so that, in the closed position of the seal sleeve, the supply pressure is isolated from the function port and the function and vent ports are in communication so that returning fluid from the function circuit can be vented. When pilot pressure operates the piston member for opening the valve, the seal sleeve is driven from its sealing engagement with the upper seal to sealed engagement with the lower seal, thus permitting the pressurized fluid supply to be communicated through the seal sleeve and through the lower seal member to the function circuit of the valve mechanism. In the open position of the seal sleeve, the vent port is isolated from the pressurized fluid medium.

The seal sleeve is provided externally with a wear resistant sealing material, such as a ceramic material, which is machined, ground or otherwise prepared to define a wear resistant external cylindrical sealing surface to resist abrasion and thus provide the valve with extended service life. The wear resistant sealing surface is engaged by a seal/wiper assembly having significant axial length to provide a bearing and guiding function to stabilize the seal sleeve during its axial movement as well as to provide a sealing function. The seal assembly is provided with a centrally located elastomer seal with polymer back-up wiper rings located on either axial side thereof. The back-up wiper rings provide for stabilizing the elastomer seal and for wiping the cylindrical sealing surface of the seal sleeve free of fluid entrained particulate as the seal sleeve is moved axially by the piston stem.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which.

DETAILED DESCRIPTION OF PREFERRED EMBODIMENT

Figure 1:
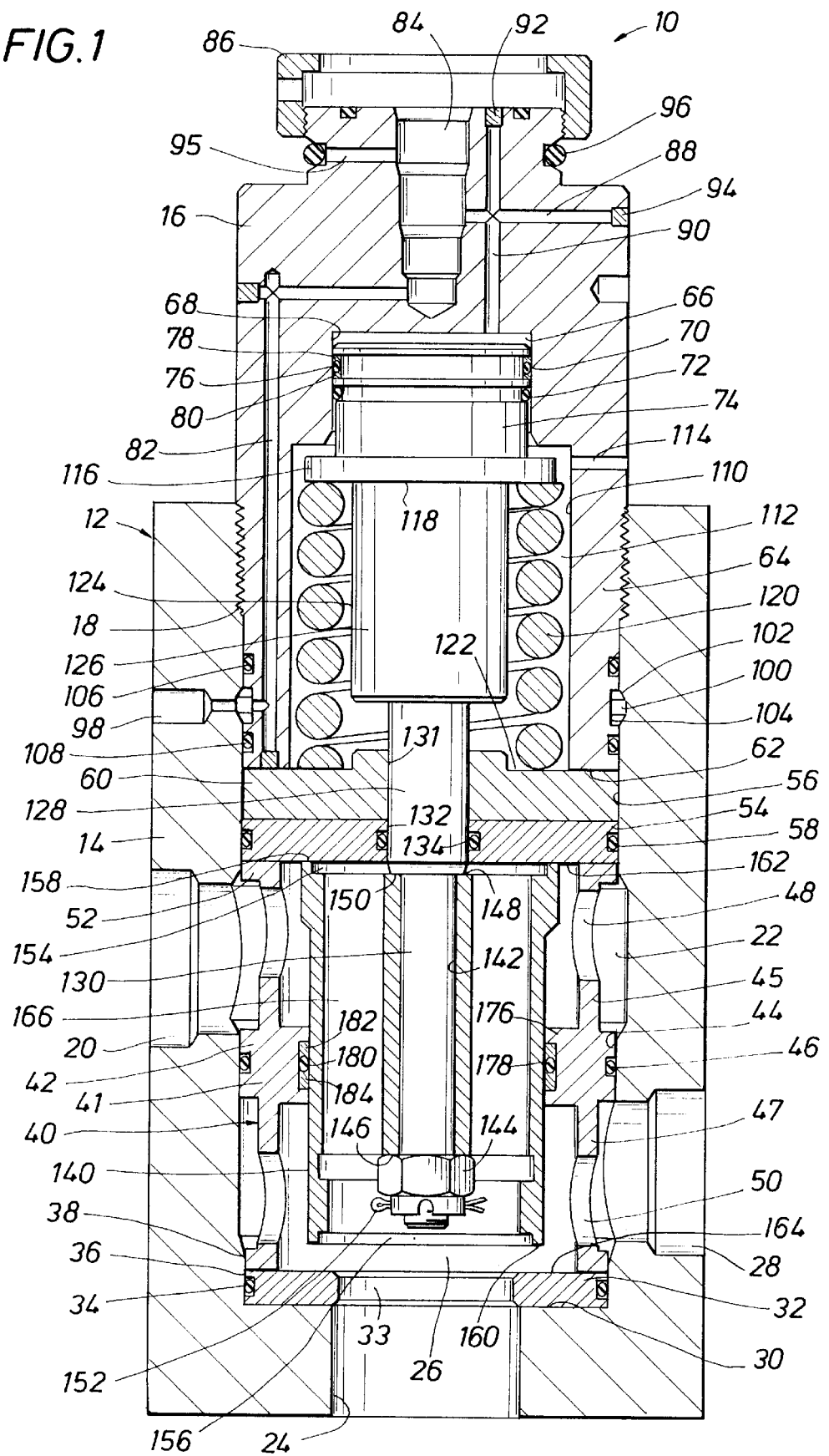
FIG. 1 is a sectional view of a two position, three-way pilot valve that is constructed in accordance with the present invention and is shown with its internal seal sleeve in the closed position.
Figure 2:
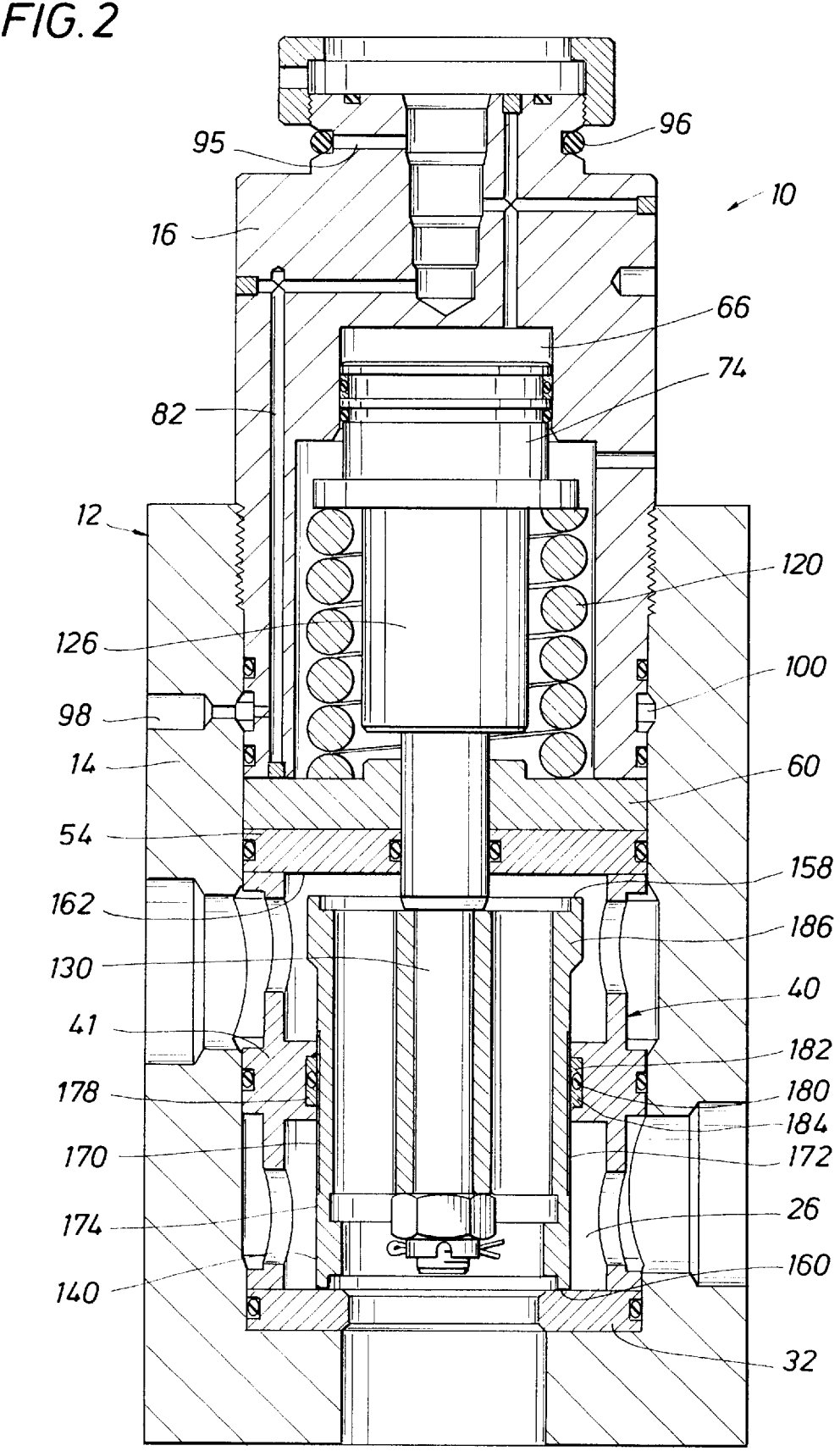
FIG. 2 is a sectional view similar to that of FIG. 1 and showing the seal sleeve member in its open position.

Referring now to the drawings and first to FIG. 1, a two position, three-way pilot valve constructed in accordance with the present invention is shown generally at 10 and incorporates a valve housing shown generally at 12 which is defined by an outer or lower housing section 14 to which is connected a upper or inner housing section 16 by means of a threaded connection 18. The valve housing section 14 defines a supply port 20 through which pressurized supply fluid is introduced into a pressure chamber 22 (at a pressure range of up to about 5,000 p.s.i., for example). The housing section 14 also defines a function port 24 through which pressurized supply fluid is directed when the seal sleeve is at its open position and which is intended for connection with a function circuit, not shown, for accomplishing intended work. Pressurized operating fluid is permitted to flow from an operating/vent chamber 26 through the function port in the "open" condition of the valves shown in FIG. 2. The housing section 14 further defines a vent port 28 which is in communication with the operation/vent chamber 26 and which provides for venting of fluid from the function circuit in communication with the port 24 when the valve mechanism is in its "closed" condition as shown in FIG. 1.

The lower portion of the valve housing section 14 defines an upwardly facing circular support shoulder 30 surrounding the function port 24 which provides support for a lower seal element 32. The lower seal element 32 is preferably formed of a polymer material such as Delrin® and is sealed with respect to the housing by a circular sealing element 34 having sealing engagement with an internal cylindrical wall surface 36. The lower seal element 32 is maintained stationary within the lower housing section 14 by a lower flange 38 of a cage member shown generally at 40. The intermediate portion 41 cage member 40 is provided with an external circular enlargement 42 which is sealed with respect to an inner wall surface 44 of the housing by a circular sealing element 46 that is contained within a circular seal groove of the circular enlargement 42. The cage member defines upper and lower tubular cage sections 45 and 47 respectively, each defining a plurality of perforations such as shown at 48 and 50 to provide for fluid interchange internally and externally of upper and lower sections of the cage member 40. At its upper end, the cage member defines an upper circular flange 52 which is a support flange providing support for an upper seal member 54 which is sealed with respect to an internal wall surface 56 of the housing section 14 by a circular external sealing element 58 that is located within an external circular seal groove of the upper seal member. The upper seal member is also preferably composed of a suitable polymer sealing material such as Delrin®. Thus, the upper seal member 54 is also maintained in static position within the lower housing section 14. The upper seal member 54 is secured in its static position by a circular spacer member 60 which is in turn is secured in stationary position by the lower circular abutment end 62 of a tubular lower section 64 of the upper housing section 16.

The upper housing section 16 defines an internal piston chamber 66 having an internal cylindrical wall 68 which is engaged by upper and lower seals 70 and 72 of a piston member 74. Because of the high pressure conditions for which the valve is designed, the upper seal assembly 70 of the piston is defined by an intermediate elastomer seal 76 having back-up rings 78 and 80 located on opposite sides thereof and being of a configuration for efficient support of the circular elastomer seal.

For operation of the piston member 74, the upper housing 16 defines a pilot pressure circuit 82 having communication with a valve receptacle 84 within which a solenoid operated pilot valve element (not shown) received and retained by a retaining nut 86. The pilot pressure circuit 82 is in communication with the piston chamber 66 via circuit passages 88 and 90 having expander plugs 92 and 94 for closing the outer portions thereof. A vent passage 95 is in communication with the valve receptacle 84 and provides for relief of pressure from the pilot valve receptacle when the solenoid valve is shifted to its valve closing position. The vent passage intersects a circular groove having a circular O-ring element 96 located therein. The O-ring functions as a relief and normally maintains the outer portion of the vent passage sealed by virtue of its engagement with tapered wall surfaces of its circular groove and, when pressure is relieved from the valve receptacle 84, the O-ring 96 is simply unseated by the venting pilot pressure which vents to the environment surrounding the valve.

The lower housing section 14 defines a pilot pressure port 98 which is normally in communication with a pilot pressure supply line, not shown, for introducing pilot pressure (in the range up to about 3,000 PSI, for example) to an internal annulus 100 that is cooperatively defined by an internal annular groove 102 of the lower housing section and an external circular groove 104 of the lower tubular section 64. The annulus 100 is sealed by circular sealing elements 106 and 108 which may be conveniently provided in the form of circular elastomer O-ring seals which are contained within external circular seal grooves of the tubular lower section 64 being located on either side of the annulus 100 and having sealing engagement with the internal cylindrical surface 56.

The tubular lower section 64 of the upper housing section 16 defines an internal cylindrical surface 110 which defines a piston/spring chamber 112 having communication with the environment externally of the valve via a vent passage 114 to prevent the valve from becoming pressure locked as the piston is moved within the piston/spring chamber. The piston element 74, externally of the piston chamber 66, has a circular thrust flange 116 defining a circular thrust shoulder 118 against which is seated the upper end of a compression spring 120, with the lower end of the compression spring being seated on an upwardly facing surface 122 of the spacer member 60. The compression spring 120 continuously exerts a force against the thrust shoulder 118 of the piston 74, thus urging the piston toward its fully engaged position within the piston chamber 66. When pilot pressure is introduced into the piston chamber 66 via the pilot pressure circuit 82 and passage 90 extending from the pilot valve receptacle 84, the pilot pressure acts upon the upper surface area of the piston forcing it downwardly against the force of the compression of the spring 120. Below the thrust shoulder 118 of the piston, the piston defines a piston stem 124 having a large upper stem section 126, an intermediate stem section 128 of smaller diameter as compared with the upper stem section and a lower, valve support stem section 130 which may be of yet smaller diameter as compared to the diameter of the intermediate stem section 128. The large diameter stem section 126 serves to stabilize the piston member 74 and to maintain the compression spring 120 properly oriented within the chamber 112. The intermediate piston stem section 128 extends through central apertures 131 and 132 of the spacer member 60 and the upper seal member 54 respectively and is sealed with respect to the upper seal member by a circular sealing element 134 that is located within an internal seal groove of the upper seal aperture 132. Thus, as the piston reciprocates within the valve mechanism during its operation, the upper seal element 54 maintains sealing relation with the intermediate stem section 128 of the piston stem and thus prevents interchange of supply pressure from the pressure chamber 22 to the piston/spring chamber 112.

A generally cylindrical seal sleeve shown generally at 140 is linearly moveable within the lower housing section 14 along with the piston stem. The seal sleeve defines a central bore 142 which receives the lower valve support stem section 130 therein. A castle nut 144 is received by a lower threaded extremity of the piston stem section 130 and engages an end surface 146 near the lower end of the seal sleeve and is tightened on the lower threaded section of the stem thereby forcing an upper end surface 148 of the seal sleeve into abutment with a circular shoulder 150 that is defined by the juncture of the intermediate stem section 128 with the lower valve support stem section 130. Thus, the seal sleeve is secured in fixed relation with the piston stem and is therefore moveable by the piston along with the piston stem. The castle nut 144 is secured at a desired position relative to the lower threaded end of the piston stem by a cotter key 152.

The axial ends of the seal sleeve are formed to define end recesses 154 and 156 and to define circular sealing ends 158 and 160 that are disposed for respective sealing engagement with planar sealing surfaces 162 and 164 of the respective upper and lower seal elements 54 and 32. The seal sleeve is also provided with a plurality of flow passages 166 which communicate pressurized fluid from the pressure chamber 22 through the seal sleeve and to the function port 24 when the seal sleeve is located in its open position, with the lower circular sealing end 160 thereof in sealing engagement with the upper surface 164 of the lower seal element 32 and with the upper sealing rim 158 spaced from the upper seal.

It is desirable to provide a valve mechanism of this type having an linearly moveable seal sleeve for opening and closing movement of the valve and having a seal assembly for sealing contact with a cylindrical external sealing surface of the seal sleeve wherein the seal assembly provides a high pressure seal capability, provides a wiping function to minimize the potential for entry of contaminants to the sealing interface and further provides for maintaining accurate positioning of the sleeve element by providing the seal sleeve with a guiding and bearing function. It is also desirable to provide an axially moveable valve sleeve element which is adapted for efficient sealing under high pressure conditions and is also provided with an external sealing surface of wear resistant character to thereby enhance the service life of the valve. These features are embodied in the two position, three-way pilot valve mechanism of this invention. The seal sleeve element shown generally at 140 is machined or otherwise formed to define an elongate, generally cylindrical shallow recess 170 which extends along a significant portion of the axial length of the seal sleeve. Within the cylindrical recess 170, there is provided a wear resistant seal sleeve liner 172 which is disposed in fixed relation with the outer surface structure of the valve sleeve. The wear resistant liner 172 may be composed of any of a number of suitable wear resistant materials. In accordance with the preferred embodiment, the seal sleeve liner is composed of a suitable ceramic material which is deposited within the cylindrical recess 170, typically by a ceramic spraying operation, and is integrally adhered or bonded to the outer surface structure of the valve sleeve within the cylindrical recess. After the ceramic sealing material is deposited within the cylindrical recess and is cured to its final hardened condition, the seal sleeve is then subjected to a suitable sealing surface preparation, such as by machining or grinding for example, so that the resulting external cylindrical sealing surface 174 defined thereby will be proper for efficient sealing under high pressure conditions.

For efficient sealing, bearing and wiping capability the central portion 41 of the cage member 40 defines a radially inwardly extending circular projection 176 having an inwardly facing circular seal groove 178 defined therein. Within the circular seal groove is centrally located a circular elastomeric sealing member 180 and a pair of polymer back-up/wiper rings 182 and 184. The back-up/wiper rings are located within the circular seal groove and on opposed sides of the elastomer O-ring and serve to secure the elastomer sealing element in place within the seal groove. The wiper rings also serve to provide a wiping function at edge portions thereof with the cylindrical sealing surface 174 so that any containments, such as particulate within the fluid being interchanged between the function port and vent port, and thus present within the operation/vent chamber 26, will be excluded from the sealing interface between the seal assembly and the cylindrical sealing surface 174. Because the seal assembly is of considerable axial length and engages the sealing surface 174 of the seal sleeve member along a significant portion of its axial length, the seal assembly also provides a bearing function to provide lateral guidance for properly orienting and stabilizing the seal sleeve element within the cage member so that its axial movement between the open and closed positions thereby will be efficiently controlled.

It should be noted that the upper end of the seal sleeve 40 defines a circular enlargement 186 so that the upper sealing end or rim 158 establishes a sealing diameter with respect to the planar sealing surface 162 of the upper seal element 54 which is greater than the seal diameter established by contact of the cylindrical sealing surface 174 by the elastomer O-ring seal 180 of the seal assembly. The pressure of supply fluid, thus acting on the differing seal diameters develops a resultant force on the seal sleeve 140 thus urging the seal sleeve upwardly along with the upward force of the return spring 120 to enhance the sealing capability of the seal sleeve in its closed position.

OPERATION

Under normal conditions, pilot pressure is continuously applied at port 98 so that the pilot pressure circuit 82 is continuously pressurized to the solenoid operated valve that is located within the valve receptacle 84. Supply fluid pressure is also continuously present within the pressure chamber 22. When the solenoid control valve is opened, pilot pressure is communicated via passages 88 and 90 to the piston chamber 66 thus acting on the upper end of the piston member 74 and driving the piston member downwardly against the force of its return spring 120. The piston, acting through its piston stem arrangement, imparts a downward force to the seal sleeve element 140 tending to unseat it. Because of the differing diameter of the seal of the seal sleeve with the upper seal 54 as compared to the diameter of the seal assembly with the wear resistant sealing surface 174, the piston force, in addition to overcoming the return spring force, must also overcome the upward force being applied by the supply pressure to the seal sleeve. When this combined upward force is overcome and the seal of the upper sealing rim 158 of the valve sleeve with the upper seal 54 is broken, the pressure induced upwardly directed force on the valve sleeve will be suddenly dissipated thereby permitting the piston to rather quickly shift the valve sleeve from its closed position to its open position. In the open position, with the lower circular seal rim 160 in sealing engagement with the upper planar surface 164 of the lower seal member 32, pressurized fluid from the supply port and pressure chamber 22 will flow downwardly through the flow passages 166 of the seal sleeve and will flow through the central port 33 of the lower seal element and into the function port 22 for delivery to the function circuit being controlled by the valve. When the sealing end or rim 160 is in engagement with the lower seal 32, the vent port 28 will be isolated by the seal sleeve from the pressurized fluid supply.

When it is desired to again close the valve, the solenoid valve within the valve receptacle 84 will be shifted to its vent position thus venting pilot pressure from the piston chamber 66 via pilot pressure passages 90, 88 and vent passage 94. With pilot pressure being relieved from the piston chamber through the vent passage 94, the piston member 174 will be driven upwardly by the return force of the compression spring 120, thereby moving the seal sleeve element upwardly until its circular sealing rim 158 moves into sealing engagement with the planar lower surface 162 of the upper seal member 54. In this condition, the valve is again closed and is ready for actuation to its open position as described above. During opening and closing movement of the seal sleeve, it is guided and stabilized by the efficient bearing and sealing function that is provided by the seal/wiper assembly that is in sealing engagement with the ceramic sealing surface of the seal sleeve. Any particulate that might be present on the wear resistant cylindrical sealing surface of the seal sleeve is wiped away by the back-up wiper rings of the seal assembly. Further, in the event any particulate should enter the sealing interface, it is enveloped by the wiper rings and elastomer seal such that it will have minimal potential for scratching or eroding the wear resistant sealing surface of the sleeve. Even further, the ceramic or other wear resistant external cylindrical sealing surface of the seal sleeve will efficiently resist the wear or abrasion that might otherwise occur as the seal sleeve is cycled between its open and closed positions. Thus, the resulting valve mechanism disclosed herein is capable of providing extended service life even when operated under high pressure conditions.

In view of the foregoing, it is evident that the present invention is one well adapted to attain all of the objects and features that are hereinabove set forth, together with other objects and features which are inherent in the apparatus disclosed herein.

As will be readily apparent to those skilled in the art, the present invention may be produced in other specific forms without departing from its spirit, scope and essential characteristics. The present embodiment is therefore to be considered as illustrative and not restrictive, the scope of this invention being defined by the claims rather than by the foregoing description, and all changes which come within the meaning and range of equivalence of the claims are therefore intended to be embraced therein.

What is claimed is:

1. A two position, three-way pilot valve comprising:
   (a) a valve body defining a valve chamber and a piston chamber therein, said valve body having a supply opening, a vent opening and a function opening and defining a pilot pressure circuit in communication with said piston chamber;
   (b) a piston being movably disposed within said piston chamber and having a piston stem movably disposed within said piston chamber and having a piston stem movably disposed within said valve chamber;
   (c) first and second seal elements being located in spaced relation within said valve chamber;
   (d) a seal sleeve having an axial length less than the spacing of said first and second seal elements and being mounted to said piston stem, said seal sleeve defining an external cylindrical sealing surface and having axial sealing ends disposed for respective sealing engagement with said first and second seal elements depending upon the position of said seal sleeve within said valve chamber, said seal sleeve defining at least one flow passage for communicating supply pressure from said supply opening through said seal sleeve to said function opening when said seal sleeve is in spaced relation with said first seal element;
   (e) a cage member being located in sealed relation within said valve chamber and maintaining said first and second seal elements in said spaced relation;
   (f) means sealing said cage member with respect to said external cylindrical sealing surface of said cage member; and
   (g) a wear resistant material being provided on said seal sleeve and defining at least a portion of said external cylindrical sealing surface, said sealing means having sealing engagement with said wear resistant material.

2. The two position, three-way pilot valve of claim 1, wherein:
   said wear resistant material being in the form of a layer adhered to said seal sleeve.

3. The two position, three-way pilot valve of claim 1, wherein:

(a) said seal sleeve defining an external sealing section of defined diameter and having an outer peripheral groove extending along a substantial axial portion thereof, and (b) said wear resistant material being in the form of a layer adhered to said seal sleeve and substantially filling said outer peripheral groove and having a cylindrical outer surface of substantially said defined diameter.

4. The two position, three-way pilot valve of claim 3, wherein:

said wear resistant material being composed of ceramic material adhered to said seal sleeve within said outer peripheral groove.

5. The two position, three-way pilot valve of claim 1, wherein said sealing means comprising:

(a) an O-ring sealing element being supported by said cage member and having sealing engagement with said external cylindrical sealing surface; and (b) a pair of wiper rings being supported by said cage member on opposed sides of said O-ring sealing element and having supporting engagement with said O-ring sealing element and sealing engagement with said external cylindrical sealing surface.

6. The two position, three-way pilot valve of claim 5, wherein:

said cage member defining spaced support shoulders facing one another and each having supporting engagement with one of said wiper rings.

7. The two position, three-way pilot valve of claim 5, wherein:

(a) said O-ring sealing element being composed of elastomeric material; and (b) said wiper rings each being composed of a polymer material having a higher durometer as compared with the durometer of said elastomeric material.

8. The two position, three-way pilot valve of claim 1, wherein said sealing means comprising:

(a) a circular inner seal support being defined by said cage member and having an internal seal groove therein defining facing circular seal support shoulders and a cylindrical seal backup surface;

(b) an O-ring sealing element being located centrally of said internal seal groove and having sealing engagement with said external cylindrical sealing surface of said seal sleeve; and (c) a pair of wiper rings being located within said internal seal groove of said seal sleeve and each being positioned in axially supporting engagement with said O-ring sealing element and in axially supported engagement with said circular seal support shoulders and in wiping and sealing engagement with said external cylindrical sealing surface of said seal sleeve.

9. The two position, three-way pilot valve of claim 8, wherein:

(a) said O-ring sealing element being composed of elastomeric material; and (b) said wiper rings each being composed of a polymer material having a higher durometer as compared with the durometer of said elastomeric material.

10. The two position, three-way pilot valve of claim 8, wherein:

said wear resistant material being in the form of a layer adhered to said seal sleeve.

11. The two position, three-way pilot valve of claim 8, wherein:

(a) said seal sleeve defining an external sealing section of defined diameter and having an outer peripheral groove extending along a substantial axial portion thereof; and (b) said wear resistant material being in the form of a layer adhered to said seal sleeve and substantially filling said outer peripheral groove and having a cylindrical outer surface of substantially said defined diameter.

12. The two position, three-way pilot valve of claim 11, wherein:

said wear resistant material being composed of ceramic material adhered to said seal sleeve.

13. A valve mechanism comprising:

(a) a valve housing defining a valve chamber and having supply and function ports in communication with said valve chamber;

(b) a pair of seal members being fixed within said valve housing and having defined spacing;

(c) a generally cylindrical seal sleeve element being positioned for axial movement within the valve chamber between open and closed positions and having sealing rims at axial ends thereof positional for selective sealing engagement with said spaced seal members, said sealing rims being spaced less than said defined spacing so that when one of said sealing rims is in sealing engagement with one of said seal elements the other of said sealing rims is in spaced relation with the other of said seal elements;

(d) a wear resistant liner being fixed to said generally cylindrical seal sleeve and defining a wear resistant cylindrical sealing surface;

(e) seal means being located within said valve chamber and having sealing engagement with said wear resistant cylindrical sealing surface; and (f) actuator means for imparting linear movement to said seal sleeve element.

14. The valve mechanism of claim 13, wherein said wear resistant liner being composed of ceramic material.

15. The valve mechanism of claim 14, wherein said ceramic material being fixed in integral assembly with said seal sleeve element and defining an outer cylindrical sealing surface for engagement by said seal means.

16. The valve mechanism of claim 13 wherein said seal means comprises:

(a) a seal support being located within said valve chamber and defining a circular seal groove facing said seal sleeve element;

(b) a circular elastomer sealing element being positioned centrally within said circular seal groove and having sealing engagement with said cylindrical sealing surface of said seal sleeve element; and (c) a pair of polymer wiper rings being located within said circular seal groove on opposite sides of said circular elastomer sealing element and each having wiping engagement with said cylindrical sealing surface for wiping said cylindrical sealing surface upon opening and closing movement of said seal sleeve.

17. The valve mechanism of claim 16, wherein:

(a) a perforate cage member being located within said valve chamber and having an intermediate portion disposed in sealed relation with said valve housing and defining said seal groove; and (b) said elastomer sealing element and said polymer wiper rings cooperately defining a bearing for stabilizing and guiding said seal sleeve during linear movement thereof by said actuator means.

18. The valve mechanism of claim 13, wherein said actuator means comprising:

(a) said valve housing, a piston chamber and a pilot pressure circuit for selective delivery of pilot pressure to said piston chamber (b) a piston being moveable within said piston chamber responsive to pilot pressure and having a piston stem;

(c) said seal sleeve element being mounted to said piston stem and having an end seal at each axial end thereof being spaced a distance less than said defined spacing and being disposed for sealing contact with respective seal members at open and closed positions of said seal sleeve element; and (d) a spring being located within said valve housing and having continuous force transmitting relation with said piston for moving said piston to a position closing said valve upon dissipation of pilot pressure within said piston chamber.

* * * * *